United States Patent
Chen et al.

(10) Patent No.: US 12,301,500 B2
(45) Date of Patent: May 13, 2025

(54) INFORMATION TRANSMISSION METHOD, DEVICE AND APPARATUS

(71) Applicant: DATANG MOBILE COMMUNICATIONS EQUIPMENT CO., LTD., Beijing (CN)

(72) Inventors: Runhua Chen, Beijing (CN); Yajuan Luo, Beijing (CN); Hui Li, Beijing (CN); Qiubin Gao, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 337 days.

(21) Appl. No.: 17/798,027

(22) PCT Filed: Dec. 3, 2020

(86) PCT No.: PCT/CN2020/133516
§ 371 (c)(1),
(2) Date: Aug. 5, 2022

(87) PCT Pub. No.: WO2021/159824
PCT Pub. Date: Aug. 19, 2021

(65) Prior Publication Data
US 2023/0103379 A1    Apr. 6, 2023

(30) Foreign Application Priority Data
Feb. 12, 2020   (CN) .......................... 202010089227.3

(51) Int. Cl.
*H04L 5/00*     (2006.01)
*H04W 72/51*    (2023.01)

(52) U.S. Cl.
CPC .......... *H04L 5/0051* (2013.01); *H04W 72/51* (2023.01)

(58) Field of Classification Search
None
See application file for complete search history.

(56) References Cited

U.S. PATENT DOCUMENTS

| | | | |
|---|---|---|---|
| 11,917,626 B2 * | 2/2024 | Xiong | ................. H04L 25/0226 |
| 12,075,455 B2 * | 8/2024 | Go | ......................... H04L 5/0051 |
| 2012/0002568 A1 * | 1/2012 | Tiirola | ................. H04L 5/0053 370/252 |

(Continued)

FOREIGN PATENT DOCUMENTS

| | | |
|---|---|---|
| CN | 107113605 A1 | 8/2017 |
| CN | 108023623 A1 | 5/2018 |

(Continued)

OTHER PUBLICATIONS

International Search Report for PCT/CN2020/133516 issued on Feb. 25, 2021 and its English Translation provided by WIPO.

(Continued)

*Primary Examiner* — Otis L Thompson, Jr.
(74) *Attorney, Agent, or Firm* — Ladas & Parry, LLP

(57) ABSTRACT

An information transmission method, an information transmission device, and an apparatus are provided. The information transmission method includes: receiving indication information from a network side device; and transmitting capability information of the UE, the capability information being used to indicate an SRS transmission capability currently supported by the UE.

18 Claims, 3 Drawing Sheets

(56) References Cited

U.S. PATENT DOCUMENTS

| | | | |
|---|---|---|---|
| 2012/0309431 A1* | 12/2012 | Bodog | H04W 16/18 |
| | | | 455/456.6 |
| 2014/0241454 A1* | 8/2014 | Kim | H04B 7/024 |
| | | | 375/267 |
| 2018/0227094 A1 | 8/2018 | Liu et al. | |
| 2019/0074883 A1 | 3/2019 | Park et al. | |
| 2019/0081751 A1* | 3/2019 | Miao | H04L 25/0224 |
| 2019/0109679 A1* | 4/2019 | Liu | H04L 5/005 |
| 2019/0207722 A1* | 7/2019 | Gao | H04B 7/088 |
| 2019/0273543 A1 | 9/2019 | Yang | |
| 2019/0319824 A1* | 10/2019 | Rico Alvarino | H04L 5/005 |
| 2019/0327693 A1 | 10/2019 | Rahman et al. | |
| 2019/0372734 A1 | 12/2019 | Choi et al. | |
| 2020/0014507 A1* | 1/2020 | Joseph | H04L 5/0037 |
| 2020/0036493 A1 | 1/2020 | Choi et al. | |
| 2020/0314885 A1* | 10/2020 | Cirik | H04L 5/0048 |
| 2020/0329437 A1* | 10/2020 | MolavianJazi | H04W 76/15 |
| 2020/0350976 A1* | 11/2020 | Bai | H04B 7/0617 |
| 2021/0067991 A1* | 3/2021 | Zhu | H04W 8/24 |
| 2021/0176094 A1 | 6/2021 | Kang et al. | |
| 2021/0185749 A1* | 6/2021 | Abedini | H04W 72/1263 |
| 2021/0258811 A1* | 8/2021 | Zhang | H04B 7/0691 |
| 2021/0281373 A1* | 9/2021 | Liu | H04L 5/0051 |
| 2022/0166482 A1* | 5/2022 | Yu | H04B 1/0458 |
| 2022/0166587 A1* | 5/2022 | Go | H04L 5/0048 |
| 2022/0200768 A1* | 6/2022 | Go | H04W 72/23 |

FOREIGN PATENT DOCUMENTS

| | | |
|---|---|---|
| CN | 110301113 A | 10/2019 |
| CN | 110463124 A | 11/2019 |
| IN | 109862622 A1 | 6/2019 |
| WO | 2018086587 A1 | 5/2018 |
| WO | 2019098800 A1 | 5/2019 |
| WO | 2020019136 A1 | 1/2020 |

OTHER PUBLICATIONS

Written Opinion for PCT/CN2020/133516 issued on Feb. 25, 2021 and its English Translation provided by WIPO.
International Report on Patentability PCT/CN2020/133516 issued on Aug. 11, 2022 and its English Translation provided by WIPO.
"Enhancements on Multi-beam Operations," 3GPP TSG-RAN WG1 Meeting #97, R1-1907360, Reno, USA, May 13-17, 2019, Source: Asia Pacific Telecom, Agenda item: 7.2.8.3.
First Office Action and search report for Chinese Patent Application 202010089227.3 issued on Jan. 19, 2022 and its English Translation provided by global dossier.
Extended European Search Report for the corresponding European Patent Application No. 20918620.4 issued by the European Patent Office on Jun. 28, 2023.

* cited by examiner

INFORMATION TRANSMISSION METHOD, DEVICE AND APPARATUS

CROSS-REFERENCE TO RELATED APPLICATIONS

This application is the U.S. national phase of PCT Application No. PCT/CN2020/133516 filed on Dec. 3, 2020, which claims the priority of the Chinese patent application No. 202010089227.3 filed in China on Feb. 12, 2020, the disclosures of which are incorporated herein by reference in their entireties.

TECHNICAL FIELD

The present disclosure relates to the field of communication technology, in particular to an information transmission method, an information transmission device, and an apparatus.

BACKGROUND

In the background technology, at most 16 (L) Sounding Reference Signal (SRS) resource sets are configured for a User Equipment (UE), and at most 64 (N) SRS resources are configured for the UE. A maximum quantity (M) of SRS resources in one SRS resource set is 16.

However, for uplink transmission for a terminal with multiple panels, beam sweeping is performed on uplink or downlink reference signals, a reference signal with best beam quality is selected, and a beam direction for the uplink transmission is determined in accordance with a beam direction of the reference signal. For example, a gNB configures one or more uplink SRS BM resource sets for the UE. Based on the configuration made by the gNB, the UE performs uplink beam sweeping through transmitting the SRS resources in different directions. Through selecting the SRS with good beam quality, the gNB has selected an uplink beam for the transmission of a target signal (the SRS, a Physical Uplink Control Channel (PUCCH), or a Physical Uplink Shared Channel (PUSCH)). For a UE with multiple panels, the number of panels to be activated by the UE simultaneously may be 1, or greater than 1, or the total number of panels.

In the background technology, the number M of the SRS resources in each SRS resource set is constant. Considering that different panels of the UE with multiple panels support different SRS resource configuration capabilities, the UE is merely capable of giving a report on the basis of a minimum value of M. Upon the reception of the minimum capability report value M, the gNB is merely capable of performing the corresponding configuration in accordance with the lowest panel capability. After the UE has switched to a better panel, the configuration made by the gNB does not match an actual panel capability of the UE and thereby does not accurately configure the SRS resources. At this time, the flexible scheduling of the UE by the gNB is restricted.

SUMMARY

The object of the present disclosure is to provide an information transmission method, an information transmission device, and an apparatus, so as to solve the problem in the background technology where the flexible scheduling of the UE by the base station is restricted.

In one aspect, the present disclosure provides in some embodiments an information transmission method for a UE, including: receiving indication information from a network side device; and transmitting capability information of the UE in accordance with the indication information, the capability information is used to indicate an SRS transmission capability currently supported by the UE.

In a possible embodiment of the present disclosure, the transmission of the capability information of the UE includes periodically transmitting the capability information of the UE in accordance with a predetermined period, and the predetermined period is configured through the indication information.

In a possible embodiment of the present disclosure, prior to receiving the indication information from the network side device, the information transmission method further includes transmitting a capability reporting request to the network side device in the case that a predetermined condition has been met.

In a possible embodiment of the present disclosure, the predetermined condition includes that one of the UE's panels has been activated, and the transmitting the capability information of the UE includes transmitting corresponding capability information in accordance with the activated state of the panel.

In a possible embodiment of the present disclosure, the capability information includes at least one of the following information: first information indicating the maximum number of SRS resource sets supported by the UE, second information indicating a maximum number of SRS resources supported by the UE, or third information indicating a maximum number of SRS resources in each SRS resource set supported by the UE.

In a possible embodiment of the present disclosure, the first information is the maximum number of SRS resource sets supported by the UE or an identifier corresponding to the maximum number of SRS resource sets supported by the UE, the second information is the maximum number of SRS resources supported by the UE or an identifier corresponding to the maximum number of SRS resources supported by the UE, and the third information is the maximum number of SRS resources in each SRS resource set supported by the UE or an identifier corresponding to the maximum number of SRS resources in each SRS resource set supported by the UE.

In a possible embodiment of the present disclosure, the capability information includes an identifier corresponding to a combination of at least two of a maximum number of SRS resource sets supported by the UE, a maximum number of SRS resources supported by the UE, or a maximum number of SRS resources in each SRS resource set supported by the UE.

In a possible embodiment of the present disclosure, prior to transmitting the capability information of the UE, the information transmission method further includes determining current capability information of the UE in accordance with a plurality of predetermined thresholds in the UE.

In another aspect, the present disclosure provides in some embodiments an information transmission method for a network side device, including: transmitting indication information; and receiving capability information transmitted by a UE in accordance with the indication information, the capability information being used to indicate an SRS transmission capability currently supported by the UE.

In a possible embodiment of the present disclosure, the receiving of the capability information transmitted by the UE in accordance with the indication information includes periodically receiving the capability information of the UE in accordance with a predetermined period, and the predetermined period is configured through the indication information.

In a possible embodiment of the present disclosure, prior to transmitting the indication information, the information transmission method further includes receiving a capability reporting request transmitted by the UE to the network side device in the case that a predetermined condition has been met.

In a possible embodiment of the present disclosure, the predetermined condition includes that one of the UE's panels has been activated, and the receiving the capability information transmitted by the UE in accordance with the indication information includes receiving corresponding capability information transmitted by the UE in accordance with an activated state of the panel.

In a possible embodiment of the present disclosure, the capability information includes at least one of first information indicating a maximum number of SRS resource sets supported by the UE, second information indicating a maximum number of SRS resources supported by the UE, or third information indicating a maximum number of SRS resources in each SRS resource set supported by the UE.

In a possible embodiment of the present disclosure, the first information is the maximum number of SRS resource sets supported by the UE or an identifier corresponding to the maximum number of SRS resource sets supported by the UE, the second information is the maximum number of SRS resources supported by the UE or an identifier corresponding to the maximum number of SRS resources supported by the UE, and the third information is the maximum number of SRS resources in each SRS resource set supported by the UE or an identifier corresponding to the maximum number of SRS resources in each SRS resource set supported by the UE.

In a possible embodiment of the present disclosure, the capability information includes an identifier corresponding to a combination of at least two of a maximum number of SRS resource sets supported by the UE, a maximum number of SRS resources supported by the UE, or a maximum number of SRS resources in each SRS resource set supported by the UE.

In a possible embodiment of the present disclosure, the indication information is further used to configure the transmission of at least one of an SRS, a PUCCH or a PUSCH.

In a possible embodiment of the present disclosure, the transmission of the indication information includes transmitting the indication information through high-layer signaling or physical layer signaling.

In yet another aspect, the present disclosure provides in some embodiments a UE, including a transceiver, a memory, a processor, and a computer program stored in the memory and used to be executed by the processor. The processor is configured to execute the computer program so as to: receive indication information from a network side device; and transmit capability information of the UE in accordance with the indication information, the capability information being used to indicate an SRS transmission capability currently supported by the UE.

In a possible embodiment of the present disclosure, the processor is further configured to periodically transmit the capability information of the UE in accordance with a predetermined period, and the predetermined period is configured through the indication information.

In a possible embodiment of the present disclosure, the processor is further configured to transmit a capability reporting request to the network side device in the case that a predetermined condition has been met.

In a possible embodiment of the present disclosure, the predetermined condition includes that one of the UE's panels has been activated, and the processor is further configured to transmit corresponding capability information in accordance with an activated state of the panel.

In a possible embodiment of the present disclosure, the capability information includes at least one of first information indicating a maximum number of SRS resource sets supported by the UE, second information indicating a maximum number of SRS resources supported by the UE, or third information indicating a maximum number of SRS resources in each SRS resource set supported by the UE.

In a possible embodiment of the present disclosure, the first information is the maximum number of SRS resource sets supported by the UE or an identifier corresponding to the maximum number of SRS resource sets supported by the UE, the second information is the maximum number of SRS resources supported by the UE or an identifier corresponding to the maximum number of SRS resources supported by the UE, and the third information is the maximum number of SRS resources in each SRS resource set supported by the UE or an identifier corresponding to the maximum number of SRS resources in each SRS resource set supported by the UE.

In a possible embodiment of the present disclosure, the capability information includes an identifier corresponding to a combination of at least two of a maximum number of SRS resource sets supported by the UE, a maximum number of SRS resources supported by the UE, or a maximum number of SRS resources in each SRS resource set supported by the UE.

In a possible embodiment of the present disclosure, the processor is further configured to determine current capability information of the UE in accordance with a plurality of predetermined thresholds in the UE.

In still yet another aspect, the present disclosure provides in some embodiments a network side device, including a transceiver, a memory, a processor, and a computer program stored in the memory and used to be executed by the processor. The processor is configured to execute the computer program, so as to: transmit indication information; and receive capability information transmitted by a UE in accordance with the indication information, the capability information being used to indicate an SRS transmission capability currently supported by the UE.

In a possible embodiment of the present disclosure, the processor is further configured to periodically receive the capability information of the UE in accordance with a predetermined period, and the predetermined period is configured through the indication information.

In a possible embodiment of the present disclosure, the processor is further configured to receive a capability reporting request transmitted by the UE to the network side device in the case that a predetermined condition has been met.

In a possible embodiment of the present disclosure, the predetermined condition includes that one of the UE's panels has been activated, and the processor is further configured to receive corresponding capability information transmitted by the UE in accordance with an activated state of the panel.

In a possible embodiment of the present disclosure, the capability information includes at least one of first information indicating a maximum number of SRS resource sets supported by the UE, second information indicating a maximum number of SRS resources supported by the UE, or third information indicating a maximum number of SRS resources in each SRS resource set supported by the UE.

In a possible embodiment of the present disclosure, the first information is the maximum number of SRS resource sets supported by the UE or an identifier corresponding to the maximum number of SRS resource sets supported by the UE, the second information is the maximum number of SRS resources supported by the UE or an identifier corresponding to the maximum number of SRS resources supported by the UE, and the third information is the maximum number of SRS resources in each SRS resource set supported by the UE or an identifier corresponding to the maximum number of SRS resources in each SRS resource set supported by the UE.

In a possible embodiment of the present disclosure, the capability information includes an identifier corresponding to a combination of at least two of a maximum number of SRS resource sets supported by the UE, a maximum number of SRS resources supported by the UE, or a maximum number of SRS resources in each SRS resource set supported by the UE.

In a possible embodiment of the present disclosure, the indication information is further used to configure the transmission of at least one of an SRS, a PUCCH or a PUSCH.

In a possible embodiment of the present disclosure, the processor is further configured to transmit the indication information through high-layer signaling or physical layer signaling.

In still yet another aspect, the present disclosure provides in some embodiments an information transmission device for a UE, including: a first reception module configured to receive indication information from a network side device; and a first transmission module configured to transmit capability information of the UE in accordance with the indication information, the capability information being used to indicate an SRS transmission capability currently supported by the UE.

In a possible embodiment of the present disclosure, the first transmission module is further configured to periodically transmit the capability information of the UE in accordance with a predetermined period, and the predetermined period is configured through the indication information.

In a possible embodiment of the present disclosure, the information transmission device further includes a request module configured to transmit a capability reporting request to the network side device in the case that a predetermined condition has been met.

In a possible embodiment of the present disclosure, the predetermined condition includes that one of the UE's panels has been activated, and the first transmission module is further configured to transmit corresponding capability information in accordance with an activated state of the panel.

In a possible embodiment of the present disclosure, the capability information includes at least one of first information indicating a maximum number of SRS resource sets supported by the UE, second information indicating a maximum number of SRS resources supported by the UE, or third information indicating a maximum number of SRS resources in each SRS resource set supported by the UE.

In a possible embodiment of the present disclosure, the first information is the maximum number of SRS resource sets supported by the UE or an identifier corresponding to the maximum number of SRS resource sets supported by the UE, the second information is the maximum number of SRS resources supported by the UE or an identifier corresponding to the maximum number of SRS resources supported by the UE, and the third information is the maximum number of SRS resources in each SRS resource set supported by the UE or an identifier corresponding to the maximum number of SRS resources in each SRS resource set supported by the UE.

In a possible embodiment of the present disclosure, the capability information includes an identifier corresponding to a combination of at least two of a maximum number of SRS resource sets supported by the UE, a maximum number of SRS resources supported by the UE, or a maximum number of SRS resources in each SRS resource set supported by the UE.

In a possible embodiment of the present disclosure, the information transmission device further includes a determination module configured to determine current capability information of the UE in accordance with a plurality of predetermined thresholds in the UE.

In still yet another aspect, the present disclosure provides in some embodiments an information transmission device for a network side device, including: a second transmission module configured to transmit indication information; and a second reception module configured to receive capability information transmitted by a UE in accordance with the indication information, the capability information being used to indicate an SRS transmission capability currently supported by the UE.

In a possible embodiment of the present disclosure, the second reception module is further configured to periodical receive the capability information of the UE in accordance with a predetermined period, and the predetermined period is configured through the indication information.

In a possible embodiment of the present disclosure, the information transmission device further includes a request reception module configured to receive a capability reporting request transmitted by the UE to the network side device in the case that a predetermined condition has been met.

In a possible embodiment of the present disclosure, the predetermined condition includes that one of the UE's panels has been activated, and the second reception module is further configured to receive corresponding capability information transmitted by the UE in accordance with an activated state of the panel.

In a possible embodiment of the present disclosure, the capability information includes at least one of first information indicating a maximum number of SRS resource sets supported by the UE, second information indicating a maximum number of SRS resources supported by the UE, or third information indicating a maximum number of SRS resources in each SRS resource set supported by the UE.

In a possible embodiment of the present disclosure, the first information is the maximum number of SRS resource sets supported by the UE or an identifier corresponding to the maximum number of SRS resource sets supported by the UE, the second information is the maximum number of SRS resources supported by the UE or an identifier corresponding to the maximum number of SRS resources supported by the UE, and the third information is the maximum number of SRS resources in each SRS resource set supported by the UE or an identifier corresponding to the maximum number of SRS resources in each SRS resource set supported by the UE.

In a possible embodiment of the present disclosure, the capability information includes an identifier corresponding to a combination of at least two of a maximum number of SRS resource sets supported by the UE, a maximum number of SRS resources supported by the UE, or a maximum number of SRS resources in each SRS resource set supported by the UE.

In a possible embodiment of the present disclosure, the indication information is further used to configure the transmission of at least one of an SRS, a PUCCH or a PUSCH.

In a possible embodiment of the present disclosure, the second transmission module is further configured to transmit the indication information through high-layer signaling or physical layer signaling.

In still yet another aspect, the present disclosure provides in some embodiments a computer-readable storage medium storing therein a computer program. The computer program is executed by a processor so as to implement the above-mentioned information transmission method for the UE or the above-mentioned information transmission method for the network side device.

The present disclosure has the following beneficial effect.

According to the information transmission method in the embodiments of the present disclosure, the UE receives the indication information from the network side device, and reports the capability information of the UE to the network side device in accordance with the indication information, so as to indicate an SRS transmission capability currently supported by the UE. As a result, after knowing the capability information, it is able for the network side device to schedule the UE in a more flexible manner with respect to the current capability of the UE.

DETAILED DESCRIPTION

In order to make the objects, the technical solutions and the advantages of the present disclosure more apparent, the present disclosure will be described hereinafter in details in conjunction with the drawings and embodiments.

Figure 1:
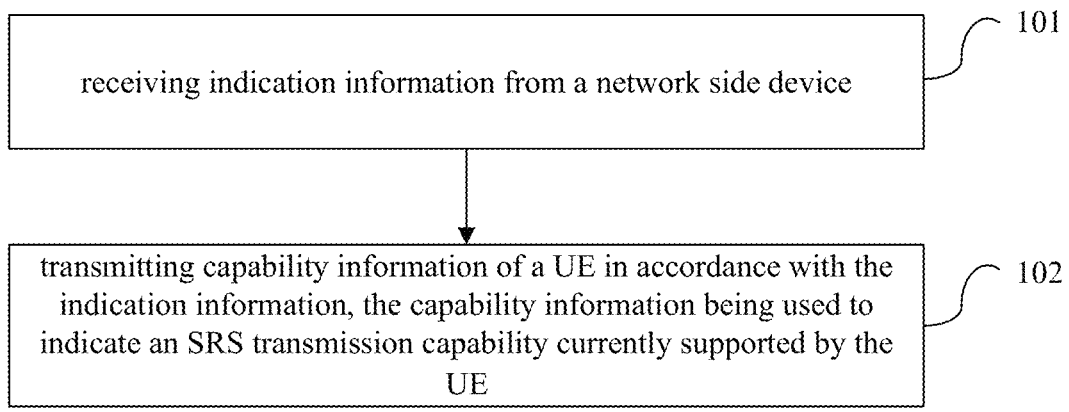
FIG. 1 is a flow chart of an information transmission method for a UE according to an embodiment of the present disclosure.

As shown in FIG. 1, the present disclosure provides in some embodiments an information transmission method for a UE, which includes: Step S101 of receiving indication information from a network side device; and Step S102 of transmitting capability information of the UE in accordance with the indication information, the capability information being used to indicate an SRS transmission capability currently supported by the UE.

Based on the above steps, the UE reports the capability information of the UE to the network side device in accordance with the indication information from the network side device, so as to indicate the SRS transmission capability currently supported by the UE. As a result, after knowing the capability information, it is able for the network side device to schedule the UE in a more flexible manner with respect to the current capability of the UE.

It should be appreciated that, the indication information is used by the network side device to indicate the UE to report the capability information. In a possible embodiment of the present disclosure, the network side device transmits the indication information through high-layer signaling or physical layer signaling.

In a possible embodiment of the present disclosure, in Step S102, the transmitting the capability information of the UE includes periodically transmitting the capability information of the UE in accordance with a predetermined period, and the predetermined period is configured through the indication information.

Here, the UE periodically reports its capability information in accordance with the predetermined period configured by the network side device through the indication information, so that the network side device performs the adjustment accordingly. To be specific, the network side device transmits the indication information through Radio Resource Control (RRC) signaling, so as to configure the UE to periodically report the capability information.

It should be noted that, the indication information is also used to merely indicate the UE to currently report the capability information once.

In a possible embodiment of the present disclosure, the indication information is further used to configure the at least one of transmission of an SRS, transmission of a PUCCH or transmission of a PUSCH.

In addition, usually a change in the capability information of the UE is affected by some factors, so a predetermined condition for triggering a request is set in the UE. Prior to Step 101, the information transmission method further includes transmitting a capability reporting request to the network side device in the case that the predetermined condition has been met.

In this regard, in the case that the predetermined condition has been met, the UE transmits the capability reporting request to the network side device, the network side device transmits the indication information to the UE in accordance with the capability reporting request, and the UE reports, or periodically reports, the current capability in accordance with the indication information.

In a possible embodiment of the present disclosure, considering that a device with multiple panels has different capabilities when different panels thereof are activated, the predetermined condition includes that one of the UE's panels has been activated, and the transmitting the capability information of the UE includes transmitting corresponding capability information in accordance with an activated state of the panel.

For example, the UE has N panels, where N is an integer greater than or equal to 2. In the case that the panels have been activated, the capability reporting request is transmitted to the network side device. After the network side device has transmitted the indication information to the UE in accordance with the capability reporting request, the UE reports the corresponding capability information in accordance with the activated state of the panels.

At a certain time point, the activated state of the panels includes that merely one panel has been activated, or more than one panel has been activated. When more than one panel has been activated, it includes a situation where all the panels have been activated.

It should be noted that, the capability information is also periodically reported in accordance with the activated state of the panels.

In a possible embodiment of the present disclosure, the capability information includes at least one of first information indicating a maximum number of SRS resource sets supported by the UE, second information indicating a maximum number of SRS resources supported by the UE, or third information indicating a maximum number of SRS resources in each SRS resource set supported by the UE.

In this regard, the capability information is implemented through at least one of the first information indicating the maximum quantity L of SRS resource sets supported by the UE, the second information indicating the maximum quantity N of the SRS resources supported by the UE, and the third information indicating the maximum quantity M of SRS resources in each SRS resource set supported by the UE.

In the embodiments of the present disclosure, the information is not restricted to be implemented through specific values of L, M and N. In a possible embodiment of the present disclosure, the first information is the maximum number of SRS resource sets supported by the UE or an identifier corresponding to the maximum number of SRS resource sets supported by the UE, the second information is the maximum number of SRS resources supported by the UE or an identifier corresponding to the maximum number of SRS resources supported by the UE, and the third information is the maximum number of SRS resources in each SRS resource set supported by the UE or an identifier corresponding to the maximum number of SRS resources in each SRS resource set supported by the UE.

In this regard, the first information may be a specific value of L, or the identifier corresponding to the value of L (e.g., an index number); the second information may be a specific value of N, or the identifier corresponding to the value of N; and the third information may be a specific value of M, or the identifier corresponding to the value of M.

In addition, in a possible embodiment of the present disclosure, for the capability information indicating at least two of L, M and N, the capability information includes an identifier corresponding to a combination of at least two of a maximum number of SRS resource sets supported by the UE, a maximum number of SRS resources supported by the UE, or a maximum number of SRS resources in each SRS resource set supported by the UE.

In this regard, the network side device may obtain the SRS transmission capability currently supported by the UE in accordance with the identifier included in the capability information through presetting or negotiation. To be specific, an identifier A corresponds to (L1, N1), and an identifier B corresponds to (L1, M2).

Taking the UE having N panels as an example, when merely one panel has been activated, the capability information reported by the UE is a value of M, and when more than one panel has been activated, the capability information reported by the UE is a value of M and a value of L, or a value of M and a value of N. In addition, when more than one panel has been activated, the capability information reported by the UE may also be a plurality of combinations of (N, L, M), and each of the combinations corresponds to a respective one of the activated panels.

In addition, in the embodiments of the present disclosure, a plurality of thresholds for L, M and N are preset by the UE with respect to its capability. In a possible embodiment of the present disclosure, prior to reporting the capability information, the information transmission method further includes determining current capability information of the UE in accordance with the plurality of predetermined thresholds in the UE.

Here, a plurality of predetermined thresholds is set with respect to each capability to be reported, e.g., a plurality of predetermined thresholds corresponding to L, a plurality of predetermined thresholds corresponding to M, a plurality of predetermined thresholds corresponding to N. It selects and determines the current capability information of the UE transmitted to the network side device in accordance with a content to be reported in a policy. For example, when merely one panel has been activated and a value of M needs to be reported, the value of M is determined from the plurality of predetermined thresholds of the UE that corresponds to M, and then the value of M or an index number corresponding to the value of M is taken as the capability information.

The application of the information transmission method in the embodiments of the present disclosure will be described hereinafter in conjunction with specific scenarios.

First scenario: a UE 1 has two panels, i.e., panel-ID0 and panel-ID1. At a time point n, panel-ID0 is activated, and the UE 1 initiates the capability reporting request. A base station transmits the indication information to trigger the UE 1 to report the maximum number of SRS resources in the SRS resource set through the PUSCH. The capability information reported by the UE 1 indicates that the maximum number of SRS resources in each SRS resource set supported by the UE is 4, i.e., M=4. Correspondingly, the base station may obtain the capability information, the base station configures an SRS resource set 0 for the UE 1 through RRC signaling in accordance with the capability information, and the corresponding SRS resources include an SRS resource 0, an SRS resource 1, an SRS resource 2, and an SRS resource 3. The base station indicates the UE 1 to transmit the PUCCH, configures a spatial relation information SpatialRelationInfo field about the PUCCH as the SRS resource 3, and indicates the UE 1 to transmit a PUCCH signal using a transmission beam direction for transmitting the SRS resource 3. At a next time point, the panel-ID0 is switched to panel-ID1, and the panel-ID1 is activated. The base station transmits again the indication information to trigger the UE 1 to report the maximum number of SRS resources in each SRS resource set through the PUSCH. The new capability information reported by the UE 1 indicates that the maximum number of SRS resources in each SRS resource set supported by the UE is 3, i.e., M=3. The base station configures an SRS resource set 1 for the UE 1 in accordance with the new capability information through RRC signaling, and the corresponding SRS resources include an SRS resource 4, an SRS resource 5, and an SRS resource 6. The base station indicates the UE 1 to transmit the PUCCH, configures a spatial relation information SpatialRelationInfo field about the PUCCH as the SRS resource 6, and indicates the UE 1 to transmit a PUCCH signal using a transmission beam direction for transmitting the SRS resource 6. The configuration of the SRS resources for the UE1 by the base station is shown in Table 1.

TABLE 1

| Time point | SRS resource set | SRS resource | Activated panel of UE 1 |
| --- | --- | --- | --- |
| $n^{th}$ | SRS resource set 0 | SRS resource 0 | panel-ID0 |
| | | SRS resource 1 | panel-ID0 |
| | | SRS resource 2 | panel-ID0 |
| | | SRS resource 3 | panel-ID0 |

TABLE 1-continued

| Time point | SRS resource set | SRS resource | Activated panel of UE 1 |
|---|---|---|---|
| $(n + 1)^{th}$ | SRS resource set 1 | SRS resource 4 | panel-ID1 |
| | | SRS resource 5 | panel-ID1 |
| | | SRS resource 6 | panel-ID1 |

Second scenario: a UE 2 has two panels, i.e., panel-ID0 and panel-ID1. The base station indicates, through RRC signaling, the UE 2 to periodically report the maximum quantity L of SRS resource sets and the maximum quantity M of SRS resources in each SRS resource set on the basis of a period T. Before the activation of the panel-ID0, the UE 2 reports capability information (L, M)=(1, 4), i.e., L=1 and M=4. After the panel-ID0 of the UE 2 has been activated, the base station configures, through the RRC signaling, an SRS resource set 0 for the UE 2 in accordance with the capability information obtained previously, and corresponding SRS resources include an SRS resource 0, an SRS resource 1, an SRS resource 2, and an SRS resource 3, as shown in Table 2. The base station indicates the UE 2 to transmit the PUSCH, and a transmission beam for the PUSCH is indicated by SpatialRelationInfo of the SRS resource 3. At a next time point (the arrival of T), before the panel-ID1 is activated simultaneously, capability information reported by the UE 2 includes a plurality of combinations of (L, M), e.g., (L1, M1)=(1, 4), and (L2, M2)=(1, 3), where (L1, M1)=(1, 4) indicates that the maximum number of SRS resource sets supported by the panel-ID0 is 1 and the maximum number of SRS resources in each SRS resource set is 4, and (L2, M2)=(1, 3) indicates that the maximum number of SRS resource sets supported by the panel-ID1 is 1 and the maximum number of SRS resources in each SRS resource set is 3. The base station configures an SRS resource set 0 and an SRS resource set 1 for the UE 2 through the RRC signaling in accordance with the new capability information. As shown in Table 2, SRS resources corresponding to the SRS resource set 0 include an SRS resource 0, an SRS resource 1, an SRS resource 2 and an SRS resource 3, and SRS resources corresponding to the SRS resource set 1 include an SRS resource 4, an SRS resource 5 and an SRS resource 6. The base station indicates the UE 2 to transmit the PUSCH, and a transmission beam for the PUSCH is indicated through SpatialRelationInfo of the SRS resource 3 and the SRS resource 6.

TABLE 2

| Time point | SRS resource set | SRS resource | Activated panel of UE 2 |
|---|---|---|---|
| $n^{th}$ | SRS resource set 0 | SRS resource 0 | panel-ID0 |
| | | SRS resource 1 | panel-ID0 |
| | | SRS resource 2 | panel-ID0 |
| | | SRS resource 3 | Panel-ID0 |
| $(n + 1)^{th}$ | SRS resource set 0 | SRS resource 0 | panel-ID0 |
| | | SRS resource 1 | panel-ID0 |
| | | SRS resource 2 | panel-ID0 |
| | | SRS resource 3 | panel-ID0 |
| | SRS resource set 1 | SRS resource 4 | panel-ID1 |
| | | SRS resource 5 | panel-ID1 |
| | | SRS resource 6 | panel-ID1 |

In a word, according to the information transmission method in the embodiments of the present disclosure, the UE receives the indication information from the network side device, and reports the capability information of the UE to the network side device in accordance with the indication information, so as to indicate an SRS transmission capability currently supported by the UE. As a result, after knowing the capability information, it is able for the network side device to schedule the UE in a more flexible manner with respect to the current capability of the UE.

Figure 2:
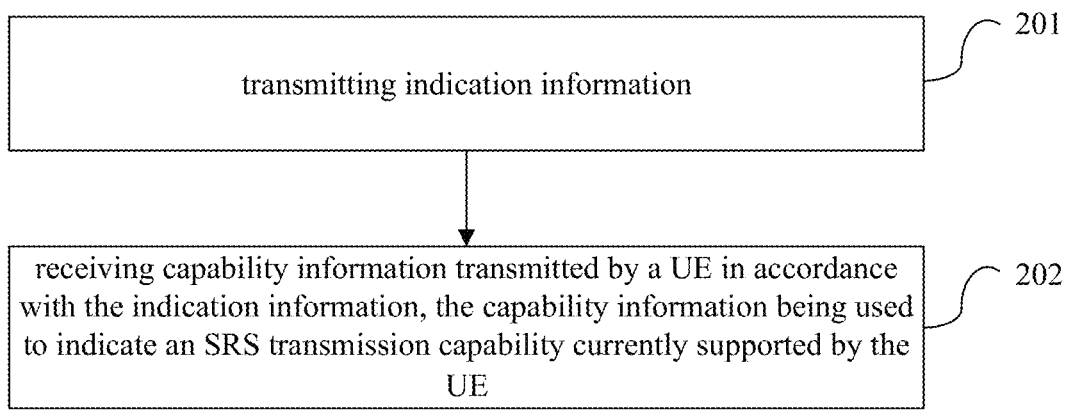
FIG. 2 is a flow chart of an information transmission method for a network side device according to an embodiment of the present disclosure.

As shown in FIG. 2, the present disclosure provides in some embodiments an information transmission method for a network side device, which includes: Step 201 of transmitting indication information; and Step 202 of receiving capability information transmitted by a UE in accordance with the indication information, the capability information being used to indicate an SRS transmission capability currently supported by the UE.

Based on the above steps, the network side device transmits the indication information, and receives the capability information transmitted by the UE in accordance with the indication information, so as to obtain the SRS transmission capability currently supported by the UE. As a result, after knowing the capability information, it is able for the network side device to schedule the UE in a more flexible manner with respect to the current capability of the UE.

In a possible embodiment of the present disclosure, the receiving the capability information transmitted by the UE in accordance with the indication information includes periodically receiving the capability information of the UE in accordance with a predetermined period, and the predetermined period is configured through the indication information.

In a possible embodiment of the present disclosure, prior to transmitting the indication information, the information transmission method further includes receiving a capability reporting request transmitted by the UE to the network side device in the case that a predetermined condition has been met.

In a possible embodiment of the present disclosure, the predetermined condition includes that one of the UE's panels has been activated, and the receiving the capability information transmitted by the UE in accordance with the indication information includes receiving corresponding capability information transmitted by the UE in accordance with an activated state of the panel.

In a possible embodiment of the present disclosure, the capability information includes at least one of first information indicating a maximum number of SRS resource sets supported by the UE, second information indicating a maximum number of SRS resources supported by the UE, or third information indicating a maximum number of SRS resources in each SRS resource set supported by the UE.

In a possible embodiment of the present disclosure, the first information is the maximum number of SRS resource sets supported by the UE or an identifier corresponding to the maximum number of SRS resource sets supported by the UE, the second information is the maximum number of SRS resources supported by the UE or an identifier corresponding to the maximum number of SRS resources supported by the UE, and the third information is the maximum number of SRS resources in each SRS resource set supported by the UE or an identifier corresponding to the maximum number of SRS resources in each SRS resource set supported by the UE.

In a possible embodiment of the present disclosure, the capability information includes an identifier corresponding to a combination of at least two of a maximum number of SRS resource sets supported by the UE, a maximum number of SRS resources supported by the UE, or a maximum number of SRS resources in each SRS resource set supported by the UE.

In a possible embodiment of the present disclosure, the indication information is further used to configure the transmission of at least one of an SRS, a PUCCH or a PUSCH.

In a possible embodiment of the present disclosure, the transmitting the indication information includes transmitting the indication information through high-layer signaling or physical layer signaling.

Figure 3:
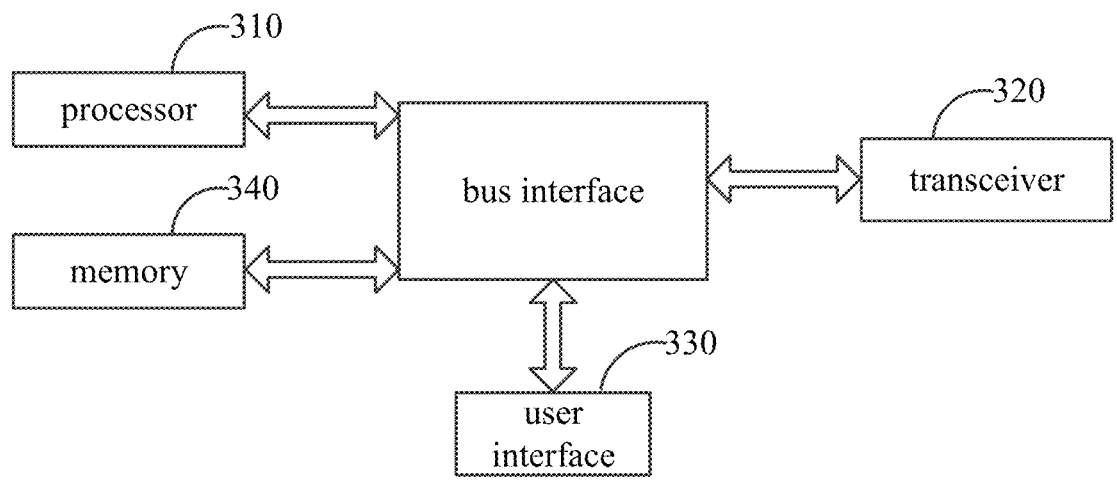
FIG. 3 is a schematic view showing the UE according to an embodiment of the present disclosure.

As shown in FIG. 3, the present disclosure further provides in some embodiments a UE, which includes a transceiver 320, a memory 340, a processor 310, and a computer program stored in the memory 340 and used to be executed by the processor 310. The processor 310 is configured to execute the computer program so as to: receive indication information from a network side device; and transmit capability information of the UE in accordance with the indication information, the capability information being used to indicate an SRS transmission capability currently supported by the UE.

In a possible embodiment of the present disclosure, the processor is further configured to periodically transmit the capability information of the UE in accordance with a predetermined period, and the predetermined period is configured through the indication information.

In a possible embodiment of the present disclosure, the processor is further configured to transmit a capability reporting request to the network side device in the case that a predetermined condition has been met.

In a possible embodiment of the present disclosure, the predetermined condition includes that one of the UE's panels has been activated, and the processor is further configured to transmit corresponding capability information in accordance with an activated state of the panel.

In a possible embodiment of the present disclosure, the capability information includes at least one of first information indicating a maximum number of SRS resource sets supported by the UE, second information indicating a maximum number of SRS resources supported by the UE, or third information indicating a maximum number of SRS resources in each SRS resource set supported by the UE.

In a possible embodiment of the present disclosure, the first information is the maximum number of SRS resource sets supported by the UE or an identifier corresponding to the maximum number of SRS resource sets supported by the UE, the second information is the maximum number of SRS resources supported by the UE or an identifier corresponding to the maximum number of SRS resources supported by the UE, and the third information is the maximum number of SRS resources in each SRS resource set supported by the UE or an identifier corresponding to the maximum number of SRS resources in each SRS resource set supported by the UE.

In a possible embodiment of the present disclosure, the capability information includes an identifier corresponding to a combination of at least two of a maximum number of SRS resource sets supported by the UE, a maximum number of SRS resources supported by the UE, or a maximum number of SRS resources in each SRS resource set supported by the UE.

In a possible embodiment of the present disclosure, the processor is further configured to determine current capability information of the UE in accordance with a plurality of predetermined thresholds in the UE.

In FIG. 3, bus architecture (represented by bus) may include a number of buses and bridges connected to each other, so as to connect various circuits for one or more processors 310 and one or more memories 340. In addition, as is known in the art, the bus architecture may be used to connect any other circuits, such as a circuit for a peripheral device, a circuit for a voltage stabilizer and a power management circuit. A bus interface may be provided between the bus and the transceiver 320, and the transceiver 320 may consist of one element, or more than one elements, e.g., transmitters and receivers for communication with any other devices over a transmission medium. For example, the transceiver 320 may receive data from the other devices, and transmit the data processed by the processor 310 to the other devices. Depending on properties of a computer system, a user interface 330 may also be provided, such as a keypad, a display, a speaker, a microphone and a joystick. The processor 310 may take charge of managing the bus architecture as well general processings, e.g., running a general-purpose operating system. The memory 340 may store data therein for the operation of the processor 310.

In a possible embodiment of the present disclosure, the processor 310 may be a Central Processing Unit (CPU), an Application Specific Integrated Circuit (ASIC), a Field-Programmable Gate Array (FPGA) or a Complex Programmable Logic Device (CPLD).

According to the embodiments of the present disclosure, the UE receives the indication information from the network side device, and reports the capability information of the UE to the network side device in accordance with the indication information, so as to indicate the SRS transmission capability currently supported by the UE. As a result, after knowing the capability information, it is able for the network side device to schedule the UE in a more flexible manner with respect to the current capability of the UE.

The UE in the embodiments of the present disclosure may perform the above-mentioned information transmission method for the UE with a similar principle and a similar technical effect, which will not be particularly defined herein.

Figure 4:
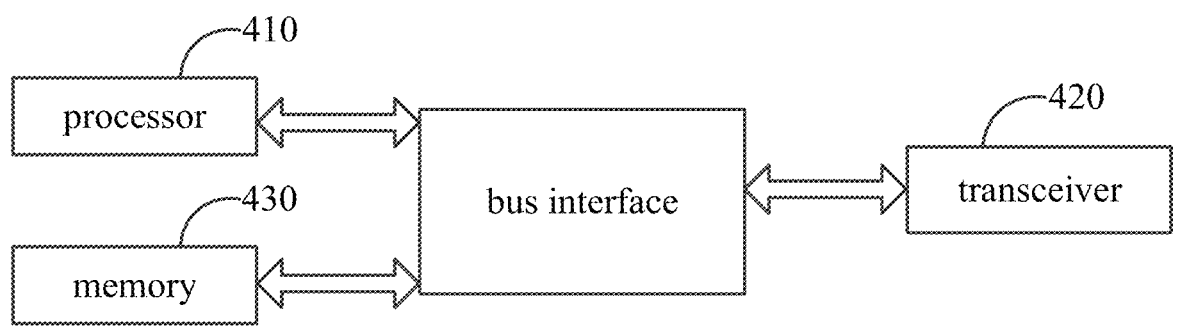
FIG. 4 is a schematic view showing the network side device according to an embodiment of the present disclosure.

As shown in FIG. 4, the present disclosure further provides in some embodiments a network side device, which includes a transceiver 420, a memory 430, a processor 410, and a computer program stored in the memory 430 and executed by the processor 410. The processor 410 is configured to execute the computer program, so as to: transmit indication information; and receive capability information transmitted by a UE in accordance with the indication information, the capability information being used to indicate an SRS transmission capability currently supported by the UE.

In a possible embodiment of the present disclosure, the processor is further configured to periodically receive the capability information of the UE in accordance with a predetermined period, and the predetermined period is configured through the indication information.

In a possible embodiment of the present disclosure, the processor is further configured to receive a capability reporting request transmitted by the UE to the network side device in the case that a predetermined condition has been met.

In a possible embodiment of the present disclosure, the predetermined condition includes that one of the UE's panels has been activated, and the processor is further configured to receive corresponding capability information transmitted by the UE in accordance with an activated state of the panel.

In a possible embodiment of the present disclosure, the capability information includes at least one of first information indicating a maximum number of SRS resource sets supported by the UE, second information indicating a maximum number of SRS resources supported by the UE, or third information indicating a maximum number of SRS resources in each SRS resource set supported by the UE.

In a possible embodiment of the present disclosure, the first information is the maximum number of SRS resource sets supported by the UE or an identifier corresponding to the maximum number of SRS resource sets supported by the UE, the second information is the maximum number of SRS resources supported by the UE or an identifier corresponding to the maximum number of SRS resources supported by the UE, and the third information is the maximum number of SRS resources in each SRS resource set supported by the UE or an identifier corresponding to the maximum number of SRS resources in each SRS resource set supported by the UE.

In a possible embodiment of the present disclosure, the capability information includes an identifier corresponding to a combination of at least two of a maximum number of SRS resource sets supported by the UE, a maximum number of SRS resources supported by the UE, or a maximum number of SRS resources in each SRS resource set supported by the UE.

In a possible embodiment of the present disclosure, the indication information is further used to configure the transmission of at least one of an SRS, a PUCCH or a PUSCH.

In a possible embodiment of the present disclosure, the processor is further configured to transmit the indication information through high-layer signaling or physical layer signaling.

According to the embodiments of the present disclosure, the network side device transmits the indication information, and receives the capability information transmitted by the UE in accordance with the indication information, so as to obtain the SRS transmission capability currently supported by the UE. As a result, after knowing the capability information, it is able for the network side device to schedule the UE in a more flexible manner with respect to the current capability of the UE.

A principle of the network side device for solving the problem is similar to that of the above-mentioned information transmission method for the network side device, so the implementation of the network side device may refer to that of the above-mentioned information method, which will not be particularly defined herein.

The transceiver 420 is used to receive and transmit data under the control of the processor 410. In FIG. 4, bus architecture may include a number of buses and bridges connected to each other, so as to connect various circuits for one or more processors 410 and one or more memories 430. In addition, as is known in the art, the bus architecture may be used to connect any other circuits, such as a circuit for a peripheral device, a circuit for a voltage stabilizer and a power management circuit. A bus interface may be provided, and the transceiver 420 may consist of a plurality of elements, i.e., a transmitter and a receiver for communication with any other devices over a transmission medium. The processor 410 may take charge of managing the bus architecture as well as general processings. The memory 430 may store therein data for the operation of the processor 410.

The processor 410 may take charge of managing the bus architecture as well as general processings. The memory 430 may store therein data for the operation of the processor 410.

Figure 5:
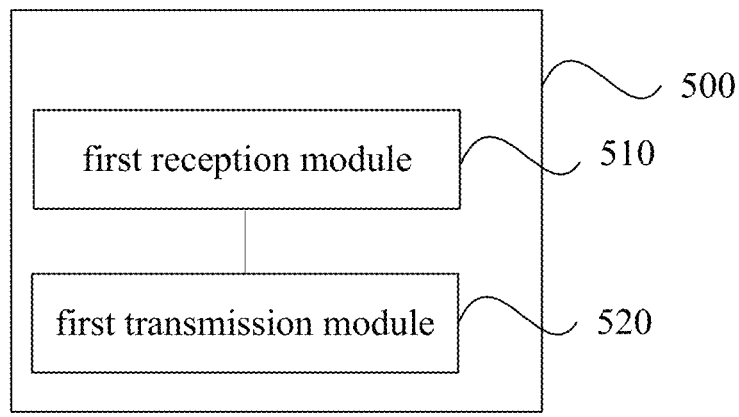
FIG. 5 is a schematic view showing an information transmission device for the UE according to an embodiment of the present disclosure.

As shown in FIG. 5, the present disclosure further provides in some embodiments an information transmission device 500 for a UE, which includes: a first reception module 510 configured to receive indication information from a network side device; and a first transmission module 520 configured to transmit capability information of the UE in accordance with the indication information, the capability information being used to indicate an SRS transmission capability currently supported by the UE.

In a possible embodiment of the present disclosure, the first transmission module is further configured to periodically transmit the capability information of the UE in accordance with a predetermined period, and the predetermined period is configured through the indication information.

In a possible embodiment of the present disclosure, the information transmission device further includes a request module configured to transmit a capability reporting request to the network side device in the case that a predetermined condition has been met.

In a possible embodiment of the present disclosure, the predetermined condition includes that one of the UE's panels has been activated, and the first transmission module is further configured to transmit corresponding capability information in accordance with an activated state of the panel.

In a possible embodiment of the present disclosure, the capability information includes at least one of first information indicating a maximum number of SRS resource sets supported by the UE, second information indicating a maximum number of SRS resources supported by the UE, or third information indicating a maximum number of SRS resources in each SRS resource set supported by the UE.

In a possible embodiment of the present disclosure, the first information is the maximum number of SRS resource sets supported by the UE or an identifier corresponding to the maximum number of SRS resource sets supported by the UE, the second information is the maximum number of SRS resources supported by the UE or an identifier corresponding to the maximum number of SRS resources supported by the UE, and the third information is the maximum number of SRS resources in each SRS resource set supported by the UE or an identifier corresponding to the maximum number of SRS resources in each SRS resource set supported by the UE.

In a possible embodiment of the present disclosure, the capability information includes an identifier corresponding to a combination of at least two of a maximum number of SRS resource sets supported by the UE, a maximum number of SRS resources supported by the UE, or a maximum number of SRS resources in each SRS resource set supported by the UE.

In a possible embodiment of the present disclosure, the information transmission device further includes a determination module configured to determine current capability information of the UE in accordance with a plurality of predetermined thresholds in the UE.

According to the embodiments of the present disclosure, the information transmission device receives the indication information from the network side device, and reports the capability information of the UE to the network side device in accordance with the indication information, so as to indicate the SRS transmission capability currently supported by the UE. As a result, after knowing the capability information, it is able for the network side device to schedule the UE in a more flexible manner with respect to the current capability of the UE.

It should be appreciated that, the information transmission method is used to execute the information transmission method, and the implementation of the information transmission method may refer to the implementation of the above-mentioned information transmission method for the UE, with a same technical effect.

Figure 6:
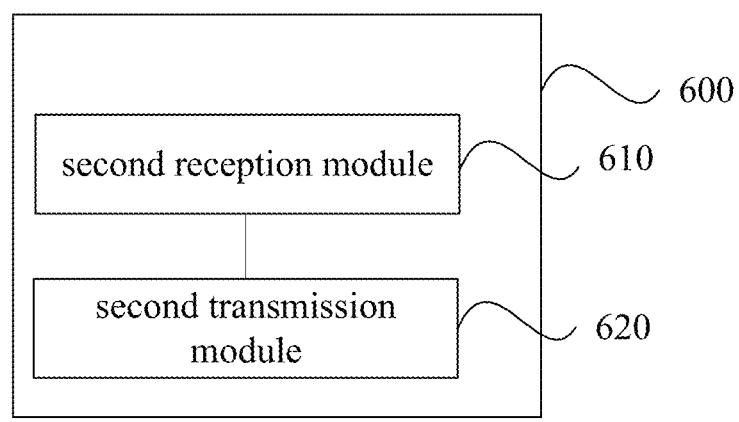
FIG. 6 is a schematic view showing an information transmission device for the network side device according to an embodiment of the present disclosure.

As shown in FIG. 6, the present disclosure further provides in some embodiments an information transmission device 600, which includes: a second transmission module 610 configured to transmit indication information; and a second reception module 620 configured to receive capability information transmitted by a UE in accordance with the indication information, the capability information being used to indicate an SRS transmission capability currently supported by the UE.

In a possible embodiment of the present disclosure, the second reception module is further configured to periodical receive the capability information of the UE in accordance with a predetermined period, and the predetermined period is configured through the indication information.

In a possible embodiment of the present disclosure, the information transmission device further includes a request reception module configured to receive a capability reporting request transmitted by the UE to the network side device in the case that a predetermined condition has been met.

In a possible embodiment of the present disclosure, the predetermined condition includes that one of the UE's panels has been activated, and the second reception module is further configured to receive corresponding capability information transmitted by the UE in accordance with an activated state of the panel.

In a possible embodiment of the present disclosure, the capability information includes at least one of first information indicating a maximum number of SRS resource sets supported by the UE, second information indicating a maximum number of SRS resources supported by the UE, or third information indicating a maximum number of SRS resources in each SRS resource set supported by the UE.

In a possible embodiment of the present disclosure, the first information is the maximum number of SRS resource sets supported by the UE or an identifier corresponding to the maximum number of SRS resource sets supported by the UE, the second information is the maximum number of SRS resources supported by the UE or an identifier corresponding to the maximum number of SRS resources supported by the UE, and the third information is the maximum number of SRS resources in each SRS resource set supported by the UE or an identifier corresponding to the maximum number of SRS resources in each SRS resource set supported by the UE.

In a possible embodiment of the present disclosure, the capability information includes an identifier corresponding to a combination of at least two of a maximum number of SRS resource sets supported by the UE, a maximum number of SRS resources supported by the UE, or a maximum number of SRS resources in each SRS resource set supported by the UE.

In a possible embodiment of the present disclosure, the indication information is further used to configure the transmission of at least one of an SRS, a PUCCH or a PUSCH.

In a possible embodiment of the present disclosure, the second transmission module is further configured to transmit the indication information through high-layer signaling or physical layer signaling.

According to the embodiments of the present disclosure, the information transmission device transmits the indication information, and receives the capability information transmitted by the UE in accordance with the indication information, so as to obtain the SRS transmission capability currently supported by the UE. As a result, after knowing the capability information, it is able for the network side device to schedule the UE in a more flexible manner with respect to the current capability of the UE.

It should be appreciated that, the information transmission method is used to execute the information transmission method, and the implementation of the information transmission method may refer to the implementation of the above-mentioned information transmission method for the network side device, with a same technical effect.

The present disclosure further provides in some embodiments a computer-readable storage medium storing therein a computer program. The computer program is used to be executed by a processor so as to implement the above-mentioned information transmission method for the UE, or the above-mentioned information transmission method for the network side device.

The computer-readable storage medium may include volatile or nonvolatile, mobile or immobile storage medium capable of storing therein information using any method or technique. The information may be a computer-readable instruction, a data structure, a program or any other data. The computer-readable storage medium may include, but not limited to, a Random Access Memory (e.g., Phase Change Random Access Memory (PRAM), Static Random Access Memory (SRAM) or Dynamic Random Access Memory (DRAM)), a Read Only Memory (ROM) (e.g., an Electrically Erasable Programmable Read Only Memory (EEPROM), a flash memory, a Compact Disc Read Only Memory (CD-ROM) or a Digital Video Disk (DVD)), a magnetic storage device (e.g., a cassette magnetic tape or a magnetic disk), or any other non-transmission medium capable of storing therein information which can be accessed by a computing device. As defined in the present disclosure, the computer-readable storage medium may not include any transitory media, e.g., modulated data signal or carrier.

It should be further appreciated that, the UE described in the specification includes, but not limited to, smart phone or tablet computer. The functional members described in the specification are referred to as modules, so as to emphasize the independence of the implementation in a more particular manner.

In the embodiments of the present disclosure, the modules are implemented by software, so as to be executed by various processors. For example, an identified, executable code module includes one or more physical or logical blocks including computer instructions, and the module is constructed as an image, a process or a function. Even so, the executable codes of the identified modules are unnecessary to be physically located together, but include different instructions stored in different locations. When these instructions are logically combined together, they form the modules and achieve the prescribed purposes of the modules.

Actually, the executable code module is a single instruction or a plurality of instructions, and even it is distributed at different code segments, in different programs, or across a plurality of memory devices. Also, operational data is identified in the modules, implemented in any appropriate form, and organized in any data structure of an appropriate type. The operational data is collected as a single data set, or distributed at different locations (including different memory devices), and it is at least partially present in a system or network merely as an electronic signal.

When the modules can be implemented by software, considering the current hardware level, a person skilled in the art can build a corresponding hardware circuit to achieve the corresponding function if taking no account of the cost. The hardware circuit includes a conventional very-large-scale integration (VLSI) circuit, a gate array, an existing semiconductor such as a logic chip and a transistor, or other discrete components. The modules are further implemented by a programmable hardware device, such as a field-programmable gate array, a programmable array logic device and a programmable logic device.

It should be appreciated that, the embodiments of the present disclosure are implemented by hardware, software, firmware, middleware, microcode or a combination thereof. For the hardware implementation, the processor includes one or more of an Application Specific Integrated Circuits (ASIC), a Digital Signal Processor (DSP), a DSP device (DSPD), a Programmable Logic Device (PLD), a Field-Programmable Gate Array (FPGA), a general-purpose processor, a controller, a microcontroller, a microprocessor, any other electronic unit capable of achieving the functions in the present disclosure, or a combination thereof.

For the software implementation, the scheme in the embodiments of the present disclosure is implemented through modules capable of achieving the functions in the present disclosure (e.g., processes or functions). Software codes are stored in the memory and used to be executed by the processor. The memory is implemented inside or outside the processor.

The above illustrative embodiments have been described with respect to the drawings, and the other embodiments may also feasible without departing from the spirit and teaching of the present disclosure, so the illustrative embodiments shall not be used to limit the scope of the present disclosure. More definitely, the illustrative embodiments are provided so as to make the present disclosure complete, and deliver the scope of the present disclosure to those skilled in the art. In the drawings, sizes and relative sizes of the members may be scaled up for clarification. Terms involved in the present disclosure are merely used to describing the specific embodiments, but shall not be inclined to become a restricted use. Unless otherwise defined, such words as "one" or "one of" are merely used to represent the existence of at least one member, rather than to limit the number thereof. Such words as "include" or "including" intend to indicate that there are the features, integers, steps, operations, elements and/or assemblies, without excluding the existence or addition of one or more other features, integers, steps, operations, elements, assemblies and/or combinations thereof. Unless otherwise defined, a numerical range may include an upper limit, a lower limit and any sub-range.

The above are optional embodiments of the present disclosure. It should be noted that a person skilled in the art may make further modifications and improvements without departing from the principle of the present disclosure, and these modifications and improvements shall also fall within the scope of the present disclosure.

What is claimed is:

1. An information transmission method for a User Equipment (UE), comprising:
   receiving indication information from a network side device
   transmitting capability information of the UE in accordance with the indication information, the capability information being used to indicate a Sounding Reference Signal (SRS) transmission capability currently supported by the UE;
   wherein prior to receiving the indication information from the network side device, the information transmission method further comprises:
   transmitting a capability reporting request to the network side device in the case that a predetermined condition has been met.

2. The information transmission method according to claim 1, wherein the transmitting the capability information of the UE comprises:
   periodically transmitting the capability information of the UE in accordance with a predetermined period, and the predetermined period being configured through the indication information.

3. The information transmission method according to claim 1, wherein the predetermined condition comprises that one of the UE's panels has been activated;
   the transmitting the capability information of the UE comprises:
   transmitting corresponding capability information in accordance with an activated state of the panel.

4. The information transmission method according to claim 1, wherein the capability information comprises at least one of:
   first information indicating a maximum number of SRS resource sets supported by the UE;
   second information indicating a maximum number of SRS resources supported by the UE; or
   third information indicating a maximum number of SRS resources in each SRS resource set supported by the UE.

5. The information transmission method according to claim 4, wherein the first information is the maximum number of SRS resource sets supported by the UE or an identifier corresponding to the maximum number of SRS resource sets supported by the UE;
   the second information is the maximum number of SRS resources supported by the UE or an identifier corresponding to the maximum number of SRS resources supported by the UE;
   the third information is the maximum number of SRS resources in each SRS resource set supported by the UE or an identifier corresponding to the maximum number of SRS resources in each SRS resource set supported by the UE.

6. The information transmission method according to claim 1, wherein the capability information comprises an identifier of a combination of at least two of:
   a maximum number of SRS resource sets supported by the UE;
   a maximum number of SRS resources supported by the UE; or
   a maximum number of SRS resources in each SRS resource set supported by the UE.

7. The information transmission method according to claim 1, wherein prior to transmitting the capability information of the UE, the information transmission method further comprises:
   determining current capability information of the UE in accordance with a plurality of predetermined thresholds in the UE.

8. An information transmission method for a network side device, comprising:
   transmitting indication information;
   receiving capability information transmitted by a UE in accordance with the indication information, the capability information being used to indicate an SRS transmission capability currently supported by the UE;
   wherein prior to transmitting the indication information, the information transmission method further comprises:

receiving a capability reporting request, the capability reporting request being transmitted by the UE to the network side device in the case that a predetermined condition has been met.

9. The information transmission method according to claim 8, wherein the receiving the capability information transmitted by the UE in accordance with the indication information comprises:
periodically receiving the capability information of the UE in accordance with a predetermined period, and the predetermined period being configured through the indication information.

10. The information transmission method according to claim 9, wherein the indication information is further used to configure the transmission of at least one of an SRS, a Physical Uplink Control Channel (PUCCH) or a Physical Uplink Shared Channel (PUSCH).

11. The information transmission method according to claim 8, wherein the predetermined condition comprises that one of the UE's panels has been activated;
the receiving the capability information transmitted by the UE in accordance with the indication information comprises:
receiving corresponding capability information transmitted by the UE in accordance with an activated state of the panel.

12. The information transmission method according to claim 8, wherein the capability information comprises at least one of:
first information indicating a maximum number of SRS resource sets supported by the UE;
second information indicating a maximum number of SRS resources supported by the UE; or
third information indicating a maximum number of SRS resources in each SRS resource set supported by the UE.

13. The information transmission method according to claim 12, wherein the first information is the maximum number of SRS resource sets supported by the UE or an identifier corresponding to the maximum number of SRS resource sets supported by the UE;
the second information is the maximum number of SRS resources supported by the UE or an identifier corresponding to the maximum number of SRS resources supported by the UE;
the third information is the maximum number of SRS resources in each SRS resource set supported by the UE or an identifier corresponding to the maximum number of SRS resources in each SRS resource set supported by the UE.

14. The information transmission method according to claim 8, wherein the capability information comprises an identifier corresponding to a combination of at least two of:
a maximum number of SRS resource sets supported by the UE;
a maximum number of SRS resources supported by the UE; or
a maximum number of SRS resources in each SRS resource set supported by the UE.

15. The information transmission method according to claim 8, wherein the transmitting the indication information comprises:
transmitting the indication information through high-layer signaling or physical layer signaling.

16. A UE, comprising a transceiver, a memory, a processor, and a computer program stored in the memory and used to be executed by the processor, wherein the processor is configured to execute the computer program to:
receive indication information from a network side device;
transmit capability information of the UE in accordance with the indication information, the capability information being used to indicate an SRS transmission capability currently supported by the UE;
wherein the processor is further configured to:
transmit a capability reporting request to the network side device in the case that a predetermined condition has been met.

17. The UE according to claim 16, wherein the processor is further configured to:
periodically transmit the capability information of the UE in accordance with a predetermined period, and the predetermined period being configured through the indication information.

18. A network side device, comprising a transceiver, a memory, a processor, and a computer program stored in the memory and used to be executed by the processor, wherein the processor is configured to execute the computer program to implement the information transmission method according to claim 8.

* * * * *